Patented Dec. 9, 1941

2,265,141

UNITED STATES PATENT OFFICE 2,265,141

MONOCARBOXYLIC ACID ESTERS OF POLYMETHYLOL PHENOLS AND PROCESS FOR PREPARING THEM

Herman A. Bruson, Philadelphia, Pa., assignor to The Resinous Products & Chemical Company, Philadelphia, Pa.

No Drawing. Application May 10, 1939,
Serial No. 272,804

11 Claims. (Cl. 260—479)

This invention relates to esters of polymethylol phenols. It deals in particular with a method of preparing such esters and with the new compounds thus produced.

Methylol derivatives of phenols, such as are obtainable by condensing formaldehyde and phenol or homologues thereof in alkaline solution, as is well known, readily go over into resins when heated. This is particularly true when they are heated with acids, acid anhydrides, or alkalies. For example, saligenin (ortho-methylol phenol) readily gives a resin when heated with acetic anhydride. (Beilstein and Seelheim, Liebig's Annalen der Chemie 117, 87 (1861).) When two or more methylol groups are present in the phenolic nucleus, the tendency to form resins is greatly increased, so much so in fact, that merely heating these compounds to 100–110° C. gives resins of the insoluble or infusible type.

One object of the present invention is to provide a method for preparing esters of polymethylol phenols wherein both the phenolic hydroxyl groups and the methylol groups are esterified. Another object is to make available esters, the most important of which are included in the general formula

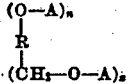

wherein R represents an aromatic hydrocarbon radical of the benzene series, A is the acyl radical of a monocarboxylic acid, $n$ is an integer from 1 to 3 inclusive, and $x$ is an integer from 2 to 4 inclusive. Still another object is to produce esters of polymethylol phenols without substantial conversion of the reactants to resins.

In accordance with this invention, any phenol, capable of forming a polymethylol derivative by reaction with formaldehyde, is condensed with at least two molecular equivalents each of formaldehyde and a strongly basic, non-aromatic, secondary amine such as dimethylamine to form a non-resinous nitrogenous condensation product, which is subsequently heated with reacting proportions of a monocarboxylic acid anhydride, whereby the nitrogen group is split off and the desired ester of the polymethylol phenol is obtained in non-resinous form. The pure esters thus obtained are definite chemical compounds.

The reaction is applicable to all phenols which possess at least two free reactive hydrogen atoms in the positions ortho and para to the phenolic hydroxyl group. Such phenols are herein briefly referred to as "polymethylol-forming phenols."

They include phenol, the three cresols, 1,2,3-xylenol, the alkyl phenols having from 2 to 18 carbon atoms or more in the alkyl group, cyclo alkyl phenols such as cyclohexyl- or camphyl phenols, aralkyl phenols such as benzylphenols, aryl phenols such as phenyl phenol, polynuclear phenols such as p,p'-dihydroxy diphenyl propane-2, p,p'-dihydroxy diphenyl sulfone, p,p'-dihydroxy diphenyl methane, and polyhydric phenols such as resorcinol, pyrogallol, pyrocatechol, or hydroquinone, and their substitution products.

Phenols which possess three available nuclear positions for condensation with formaldehyde, such as phenol itself or metacresol, are readily converted into esters of the hitherto unknown trimethylol phenol or trimethylol-m-cresol, respectively. Phenols possessing four available nuclear positions ortho to the phenolic hydroxyl groups, as, for example, p,p'-dihydroxy diphenyl propane-2, are converted into dimethylol or tetramethylol esters. This is in part already disclosed in a copending application, Serial No. 261,773, filed March 14, 1939, now Patent No. 2,220,834, issued November 5, 1940.

In the esterification process, one mol of monocarboxylic acid anhydride is used for each aminomethylene group and for each phenolic hydroxyl group which is to be esterified. Or the phenolic hydroxyl groups may be left substantially unesterified, if desired, by using only enough acid anhydride to react with the aminomethylene groups.

In the preferred form of this invention, it has been found advantageous to esterify all the free or potential hydroxyl groups in the compounds used and to employ for the purpose the anhydrides of the lower aliphatic monobasic acids, such as, for example, acetic, propionic, or butyric anhydride. It is to be understood, however, that the anhydrides of higher aliphatic acids or of other carboxylic acids of the aliphatic, aromatic, alicyclic or heterocyclic series can be used, for instance benzoic anhydride, crotonic anhydride, furoic anhydride, hexahydrobenzoic anhydride, etc.

The following examples illustrate this invention:

*Example 1*

| | Grams |
|---|---|
| Phenol (1 mol) | 94 |
| 25% dimethylamine solution (4 mols) | 720 |
| 30% formaldehyde solution (3.5 mols) | 350 |

The phenol is dissolved in the dimethylamine solution and the mixture cooled to 20° C. The formaldehyde solution is then added dropwise to the mixture while the mixture is stirred and cooled to 20–25° C. The addition requires about 30 minutes. The mixture is stirred for ten minutes longer at 20–25° C. and then is heated under reflux at 90–95° C. for about one and one-quarter hours. To the hot solution, 200 g. of sodium chloride is added and the hot mixture stirred for 20 minutes. The oil layer is separated from the hot solution and distilled under reduced pressure, the fraction B. P. 130–150° C./1–2 mm. being collected. The yield is 228 g. of tri-(dimethyl-amino-methyl)-phenol.

A mixture consisting of 132 g. of the above tri-(dimethyl-amino-methyl)-phenol and 255 g. of acetic anhydride is boiled under reflux for 3 hours and the product distilled under reduced pressure. The fraction boiling between 175° and 210° C./1 mm. is collected as the desired 2,4,6-trimethylol phenol tetra-acetate. It is a colorless, viscous oil. The yield is 154 g. Its formula is

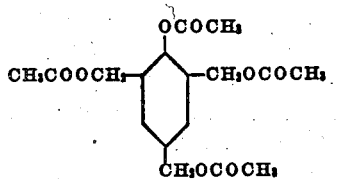

When pure, it boils at 200–210° C./1–2 mm. Upon catalytic hydrogenation with Raney nickel at 175° C. and a hydrogen pressure of 1500–2000 lbs. per square inch, it splits off acetic acid by hydrogenolysis and gives the acetate of 2,4,6-trimethylphenol, from which 2,4,6-trimethylphenol can be obtained by saponification.

*Example 2*

| | Grams |
|---|---|
| Meta-cresol (1 mol) | 108 |
| 25% dimethylamine solution (4 mols) | 720 |
| 30% formaldehyde solution (3.5 mols) | 350 |

The meta-cresol is mixed with the dimethylamine solution and the mixture cooled, treated with the formaldehyde, and worked up as in Example 1. The tri-(dimethylamino-methyl-m-cresol distills over at 138–145° C./2 mm.

84 g. of the above tri-(dimethylamino-methyl)-m-cresol and 153 g. of acetic anhydride is boiled for two and three-quarter hours under reflux, and the product distilled under reduced pressure. The fraction boiling between 185° and 205° C./1 mm. is the desired 2,4,6-trimethylol-m-cresol tetra-acetate having the formula

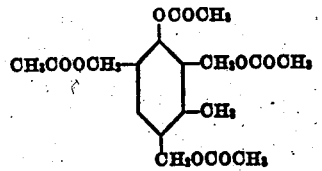

When pure, it is a colorless, viscous oil boiling at 195–200° C./0.5–1 mm. The yield is 85% of theory.

*Example 3*

To a solution consisting of 300 cc. of methanol, 404 cc. of 25% dimethylamine solution and 288 g. of p,p'-dihydroxy diphenyl propane-2 there is gradually added 204 cc. of 30% formaldehyde while the mixture is stirred and cooled to 25–30° C. The reaction mixture is allowed to stand for 18 hours at ordinary temperature and then is heated at 60–65° C. for a half hour. The solvent, water, and volatile material is then removed by heating the product at 100° C. under reduced pressure, leaving as a residue 342 g. of a brown, viscous oil containing 8% nitrogen by analysis. This substance consists essentially of di-(dimethylamino-methyl)-p,p'-dihydroxy diphenyl propane-2.

A mixture of 34 g. of this substance and 45 g. acetic anhydride is boiled for three hours under reflux, and the product is distilled under reduced pressure. Dimethylol-p,p'-dihydroxy diphenyl propane tetra-acetate distills over between 240° and 260° C./1 mm. as a colorless oil which, on cooling, forms a thick, balsam-like mass having a saponification number 495, as compared to the calculated value 492.

*Example 4*

| | Grams |
|---|---|
| p,p'-dihydroxy diphenyl propane-2 | 114 |
| Methanol | 100 |
| 25% dimethylamine solution | 450 |
| 30% formaldehyde solution | 225 |

The formaldehyde is added dropwise to the methanol solution of the dihydroxy diphenyl propane and dimethylamine solution while cooling to 20–30° C. Thereafter the mixture is boiled for one and one-quarter hours under reflux. The viscous oil layer is separated, washed with water, taken up in benzene, washed again with water, and dried in vacuo at 100° C. at 25 mm. The dark, viscous mass obtained gradually crystallizes on standing to tetra-(dimethylamino-methyl)-dihydroxy diphenyl propane-2, which, after recrystallization from petroleum ether, forms colorless crystals melting at 83° C. For conversion to the hexa-acetate, either the crystalline or the crude, viscous compound may be used.

91.2 g. of the crystalline product obtained above is boiled under reflux for three hours with 153 g. of acetic anhydride. The reaction product is heated in vacuo at 1 mm. at 100° C. to remove volatile materials. The residual product forms a pale amber-colored, viscous oil which cannot be distilled at 1 mm. pressure without decomposition. Its acetyl value corresponds to the tetra-methylol-p,p'-dihydroxy diphenyl propane-2 hexa-acetate, having the probable formula

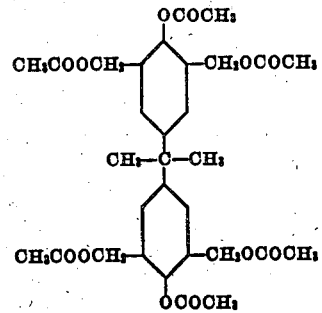

*Example 5*

| | Grams |
|---|---|
| Hydroquinone | 110 |
| 25% dimethylamine solution | 540 |
| 30% formaldehyde solution | 300 |

The formaldehyde is added dropwise at 20–30° C. to the cooled mixture of the hydroquinone and dimethylamine. The mixture is stirred for three hours thereafter at room temperature, and the crystalline product filtered off and recrystallized from alcohol. The yield is 90 g. of di-(dimethylamino-methyl)-hydroquinone, M. P. 190° C.

45 g. of the above product is boiled with 90 g. of acetic anhydride for three hours under reflux.

On cooling, the mixture solidifies to crystals of hydroquinone-2,5-dimethylol-tetra-acetate, having the formula

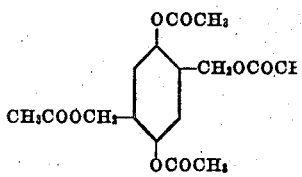

The yield is 43 g. The compound crystallizes from benzene in colorless crystals, M. P. 119° C.

*Example 6*

A mixture consisting of 122 g. of acetic anhydride and 61.6 g. of di-(morpholino-methyl)-resorcinol is boiled under reflux for two and three-quarter hours. The reaction product is then distilled under reduced pressure. The fraction boiling at 193–197° C./1 mm. is the desired dimethylol resorcinol tetra-acetate. The di-(morpholino-methyl)-resorcinol used above is obtainable by condensing resorcinol with 2 mols each of formaldehyde and morpholine, as described in applicant's U. S. Patent No. 2,040,040.

*Example 7*

A mixture consisting of 65 g. of di-(morpholino-methyl)-pyrogallol and 153 g. of acetic anhydride is boiled for three hours under reflux. Upon distillation of the reaction product in vacuo, the desired penta-acetate of dimethylol pyrogallol distills over at 235–245° C./1–3 mm. as a colorless, viscous mass, which solidifies when cold. After recrystallization from alcohol, it forms colorless crystals which melt at 75–76° C.

The di-(morpholino-methyl)-pyrogallol used above is obtainable by condensing pyrogallol with 2 mol equivalents each of formaldehyde and morpholine, as described in applicant's U. S. Patent No. 2,040,040.

In the above examples, the acetic anhydride can be replaced by a molecularly equivalent quantity of propionic anhydride, butyric anhydride, crotonic anhydride, or the anhydride of any other monocarboxylic acid, to yield analogous esters of polymethylol phenols.

Finally, the dimethylamine or morpholine used in the above examples can be replaced by other non-aromatic, secondary amines, such as diethylamine, piperidine, pyrrolidine, diethanolamine, dicyclohexylamine, and the like.

The products are useful as plasticizers for organic molding powders, films, or sheets and as intermediates for making resins.

I claim:

1. A process for preparing a non-polymeric ester of a polymethylol phenol and a monocarboxylic acid, which comprises condensing reacting proportions of a monocarboxylic acid anhydride with a nitrogenous condensation product of a phenol having at least two of the nuclear hydrogen atoms ortho and para to the hydroxyl group available for reaction and at least two molecular equivalents each of formaldehyde and a non-aromatic, secondary amine.

2. A process for preparing an ester of a polymethylol phenol and a monocarboxylic acid which comprises condensing at least two molar proportions of a monocarboxylic acid anhydride with one molar proportion of the non-resinous nitrogenous condensation product obtained by condensing one molar proportion of a phenol having at least two of the nuclear hydrogen atoms ortho and para to the hydroxyl group available for reaction with at least two molar proportions each of formaldehyde and a non-aromatic, secondary amine.

3. A process for preparing an ester of a polymethylol phenol and a monocarboxylic acid which comprises condensing at least two molar proportions of an anhydride of a lower aliphatic monobasic carboxylic acid with one molar proportion of the non-resinous nitrogenous condensation product obtained by condensing one molar proportion of a phenol having at least two of the nuclear hydrogen atoms ortho and para to the hydroxyl group available for reaction with at least two molar proportions each of formaldehyde and a non-aromatic, secondary amine.

4. The process of claim 3 in which the acid anhydride is acetic anhydride.

5. A method for preparing an ester of a polymethylol phenol, which comprises condensing a phenol having at least two of the nuclear hydrogen atoms ortho and para to the hydroxyl group available for reaction with at least two molecular equivalents each of formaldehyde and of a non-aromatic, secondary amine, separating the condensation product thus formed, and reacting said condensation product with a monocarboxylic acid anhydride.

6. As a new chemical compound, an ester of a 2,4,6-trimethylol phenol and a lower fatty acid.

7. As a new chemical compound, 2,4,6-trimethylol phenol tetra-acetate.

8. As a new chemical compound, 2,4,6-trimethylol-m-cresol tetra-acetate.

9. As a new chemical compound, tetramethylol-p,p'-dihydroxy diphenyl propane-2-hexa-acetate having the formula

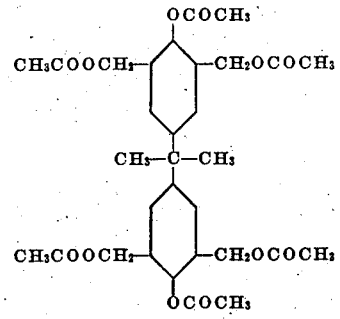

10. As a new chemical compound, a non-polymeric ester of a polymethylol phenol in which the hydrogen atoms of the phenolic and of the methylol groups are replaced by the acyl radical of a monocarboxylic acid.

11. As a new chemical compound, a non-polymeric ester of a trimethylol phenol in which the hydrogen atoms of the phenolic and of the methylol groups are replaced by the acyl radical of a monocarboxylic acid.

HERMAN A. BRUSON.